United States Patent [19]
Hillinger

[11] Patent Number: 5,400,520
[45] Date of Patent: Mar. 28, 1995

[54] HOUSING FOR A REEL OF METAL MEASURING TAPE

[75] Inventor: George Hillinger, Los Angeles, Calif.

[73] Assignee: Liao, Huei-Yen, Taipei, Taiwan, Prov. of China

[21] Appl. No.: 255,827

[22] Filed: Jun. 8, 1994

Related U.S. Application Data

[63] Continuation of Ser. No. 93,560, Jul. 19, 1993, abandoned.

[51] Int. Cl.⁶ .................................................. G01B 3/10
[52] U.S. Cl. .......................................... 33/761; 33/769
[58] Field of Search ................. 33/755, 761, 767, 769, 33/762, 763, 764, 765, 766; 242/84.8, 107.2

[56] References Cited

U.S. PATENT DOCUMENTS

| | | | |
|---|---|---|---|
| 1,988,428 | 1/1935 | Carlson | 33/761 |
| 2,172,043 | 9/1939 | Wolf | 33/767 |
| 3,073,544 | 1/1963 | Cirves et al. | 33/761 |
| 3,164,907 | 1/1965 | Quenot | 33/767 |
| 3,220,112 | 11/1965 | Quenot | 33/769 |
| 3,381,916 | 5/1968 | Edgell | 33/767 |
| 3,426,435 | 2/1969 | Ballard et al. | 33/767 |
| 3,443,316 | 5/1969 | Edgell | 33/767 |
| 3,450,367 | 6/1969 | Edgell | 242/84.8 |
| 4,976,048 | 12/1990 | Blackman | 33/767 |
| 5,027,526 | 7/1991 | Crane | 33/763 |

Primary Examiner—William A. Cuchlinski, Jr.
Assistant Examiner—G. Bradley Bennett
Attorney, Agent, or Firm—Edgar W. Averill, Jr.

[57] ABSTRACT

An improved housing for a reel of measuring tape. The housing has a base member which holds a slotted pin to support the return spring. A frame is held at the edge of the base member and has an opening for the measuring tape to be reeled in and out. A portion of the frame also forms a portion of the cover. An upper base and cover member is held against the frame to complete the housing for the measuring tape. The construction has the advantage of permitting the assembler to hold the spring as well as the measuring tape at about a right angle with respect to the slotted pin. This makes the manufacturing process safer and less costly.

6 Claims, 4 Drawing Sheets

HOUSING FOR A REEL OF METAL MEASURING TAPE

This is a continuation of application Ser. No. 08/093,560, filed on Jul. 19, 1993, now abandoned.

BACKGROUND OF THE INVENTION

The field of the invention is measuring tapes and the invention relates more particularly to the construction of the housing of measuring tapes of the type which contain a return spring.

The most common housings for measuring tapes have two half housings which each have a wall extending to the midsection of the housing. This forces the manufacturer to wind the spring and the tape on the slotted pin in the center of the housing at an angle. This results in a hazardous assembly operation which is both unnecessarily slow and the cause of some injury to assembling personnel.

Many construction of measuring tapes are known. U.S. Pat. No. 1,988,428 shows a measuring tape held in a housing with no return spring but a confining belt is used to hold the reel of tape in any position. U.S. Pat. No. 2,172,043 shows a spring reel tape measure which has a base with an upwardly extending side wall.

U.S. Pat. No. 3,073,544 shows a tape which converts to a circular measuring member after it has been withdrawn from its container. U.S. Pat. No. 3,164,907 shows a tape housing with a novel method of holding the tape in any desired degree of extension as does U.S. Pat. No. 3,220,112. Lastly, U.S. Pat. No. 3,443,316 shows a hinge construction of a housing for measuring tape.

None of the above designs provides a safe and efficient method for winding the spring and tape into the housing and thus, a better design is needed.

SUMMARY OF THE INVENTION

The present invention is for an improved housing for a reel of measuring tape of the type which has a base which supports a slotted pin which holds the inner end of a tensioning spring. A measuring tape supporting roller has an inner compartment for the tensioning spring and the measuring tape passes around the outer surface of the tape supporting roller. A base member has a flat base supporting a slotted pin. The base member has a peripheral edge which extends only slightly above the flat base. A frame is held at the peripheral edge of the base member and extends upwardly a distance sufficient to surround the tape supporting roller. The frame has a lower edge which meets with the base member and an upper edge. The frame also includes a measuring tape exit slot and a cover portion adjacent the measuring tape exit slot. A cover member has a flat top and a peripheral edge which abuts the upper edge of the frame, and means are provided for securing the base member, the frame and cover member together. Preferably, the cover member has a cutout which abuts the cover portion of the frame member.

DESCRIPTION OF THE PREFERRED EMBODIMENTS

Figure 1:
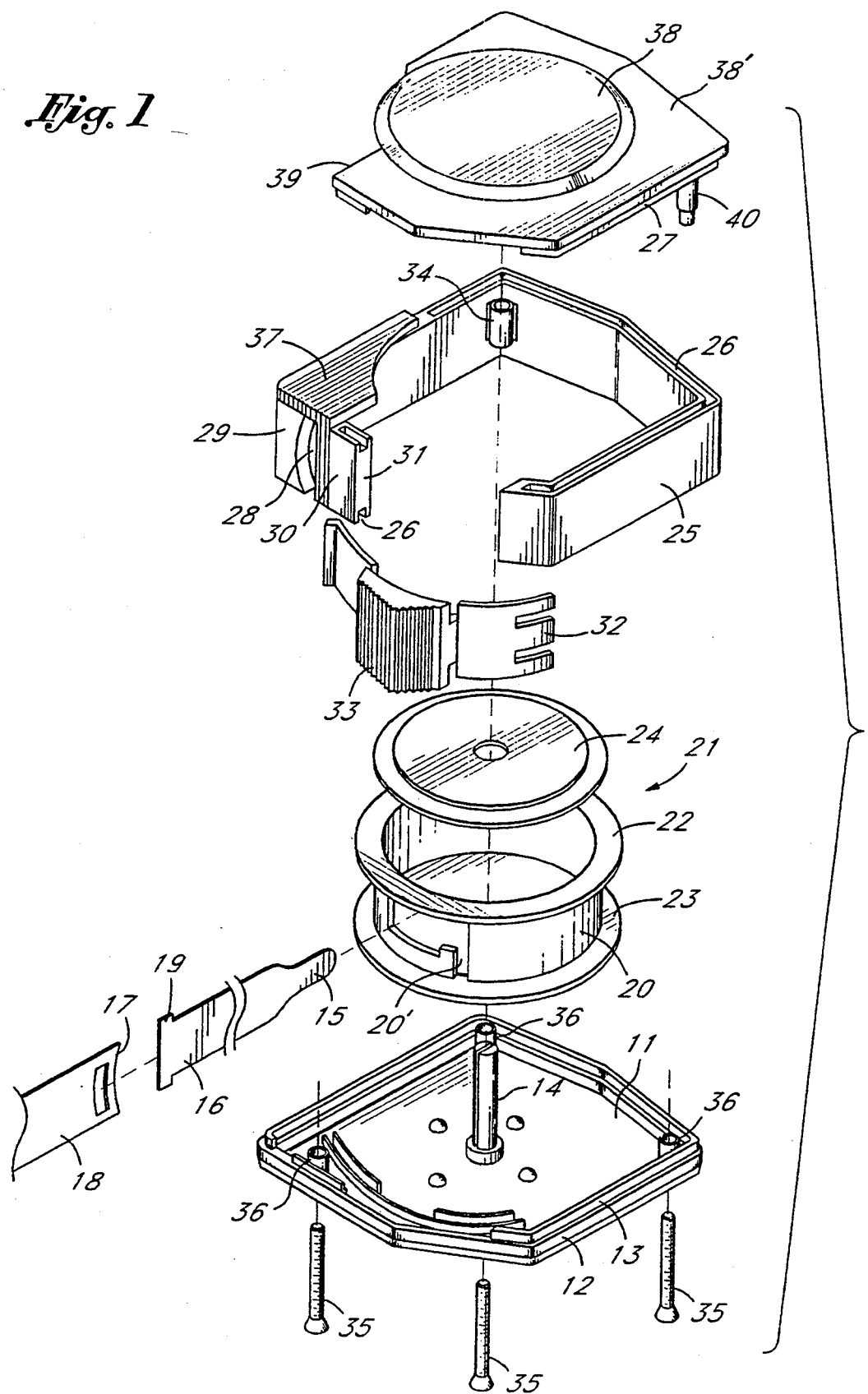
FIG. 1 is an exploded perspective view of the improved tape measure of the present invention.

The measuring tape of the present invention is shown in an exploded perspective view in FIG. 1. The housing has a lower base 11 which has an outer peripheral edge 12 which includes a ridge 13. A slotted pin 14 is supported by lower base 11 and holds the end 15 of spring 16. The end 17 of measuring tape 18 is held by the tab 19 at the end of the spring in a conventional manner. The spring passes through opening 20' in ring 20 of roller 21. End 15 passes into the slot of slotted pin 14 in a conventional manner as discussed in more detail below. Roller 21 has an upper flange 22 and a lower flange 23 which hold the measuring tape 18 securely on ring 20. A round plate 24 is held above the coiled spring 16. A frame 25 has a peripheral groove 26 along both the upper and lower edges thereof into which ridge 13 on the lower base 11 fits and ridge 27 on upper base 38' also fits. Frame 25 has a measuring tape opening 28 formed between wall portions 29 and 30. There is an opening 31 into which the tape locking device 32 is placed. The knurled knob 33 may be pushed up or down to hold the tape in a desired position in a manner analogous to conventional tape measures. A tube 34 provides a frame support and an alignment cylinder. One of the screws 35 which passes through one of the holes 36 also passes through the frame support and alignment tube 34. Tube 34 is molded integrally with frame 25. A cover portion 37 is also molded integrally with frame 25 and passes over the measuring tape opening 28 to support wall portion 30. Cover portion 37 provides a minor cover member and the cover plate 38 provides the major cover member. The cover plate 38 has a cutout 39 which mates with cover portion 37 when cover plate 38 and upper base 38' are installed in place. Two threaded pins 40 hold upper base 28 in place with two of the screws 35. One of the screws 35 passes through alignment tube 34 of frame 25, connecting hole 36 to pin 40, securing this way together lower base 11, frame 25 and upper base 38'.

Figure 2:
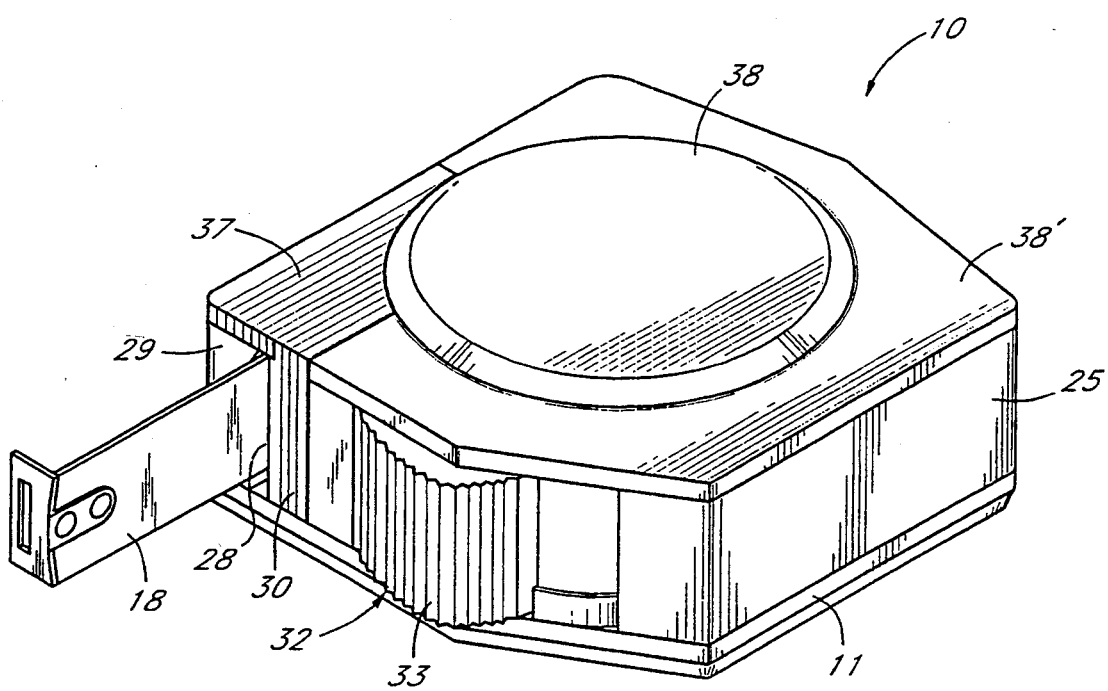
FIG. 2 is a perspective view of the exterior thereof.

The exterior of the measuring tape assembly is shown in FIG. 2 and indicated by reference character 10.

Figure 3:
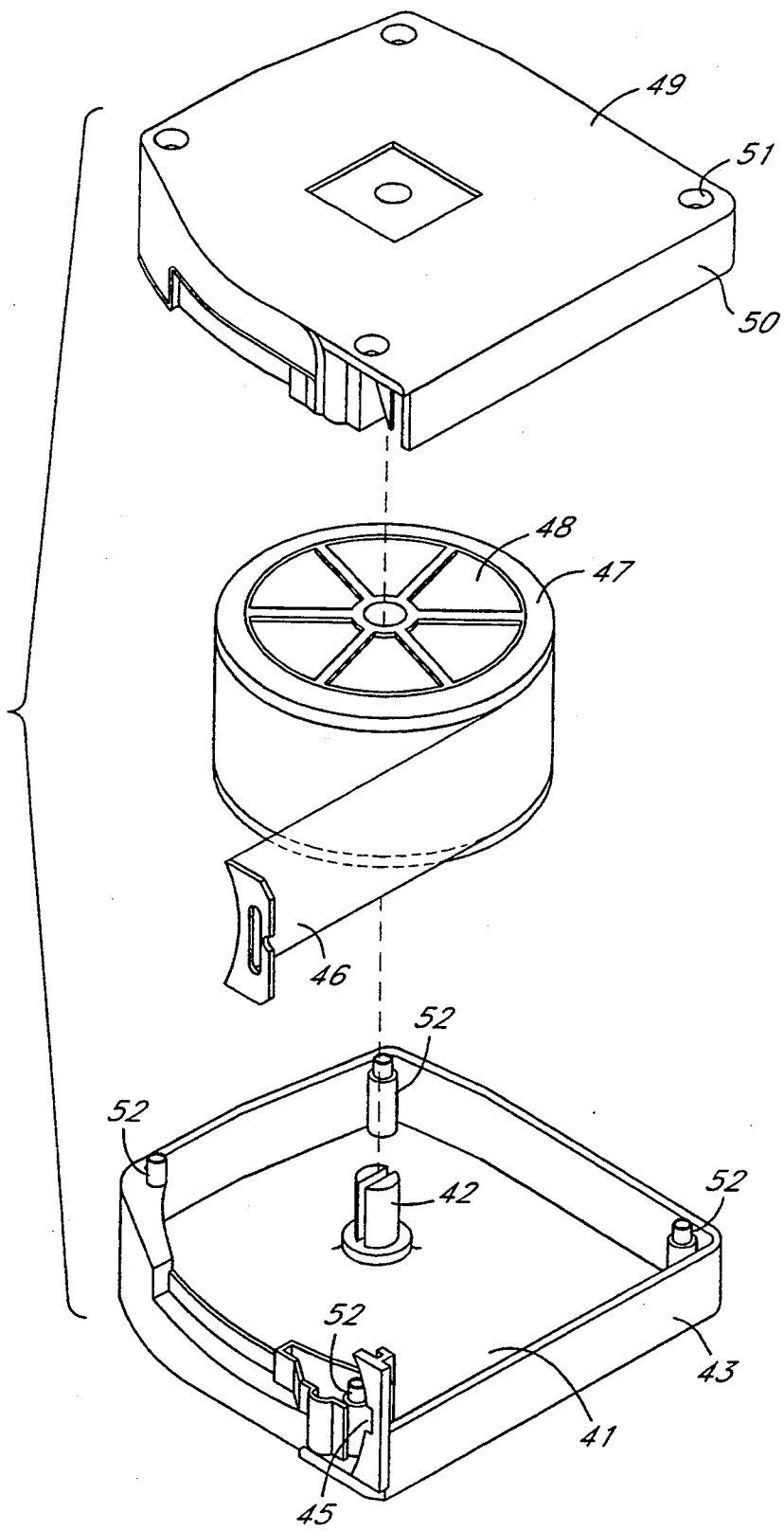
FIG. 3 is an exploded perspective view of a prior art tape measure assembly.

A prior art measuring tape is shown in FIG. 3 and has a base 41 which supports a slotted pin 42. Raised sides 43 extend to about the midpoint of the assembled tape measure and an opening 45 is provided in the side thereof for passage of the measuring tape 46. Tape 46 is held on a roller 47. The position of the intake spring is indicated by reference character 48. An upper half 49 has sides 50 which also pass about to the midpoint of the assembled measuring device. Screw holes 51 permit the passage of screws into threaded screw supports 52.

Figure 4:
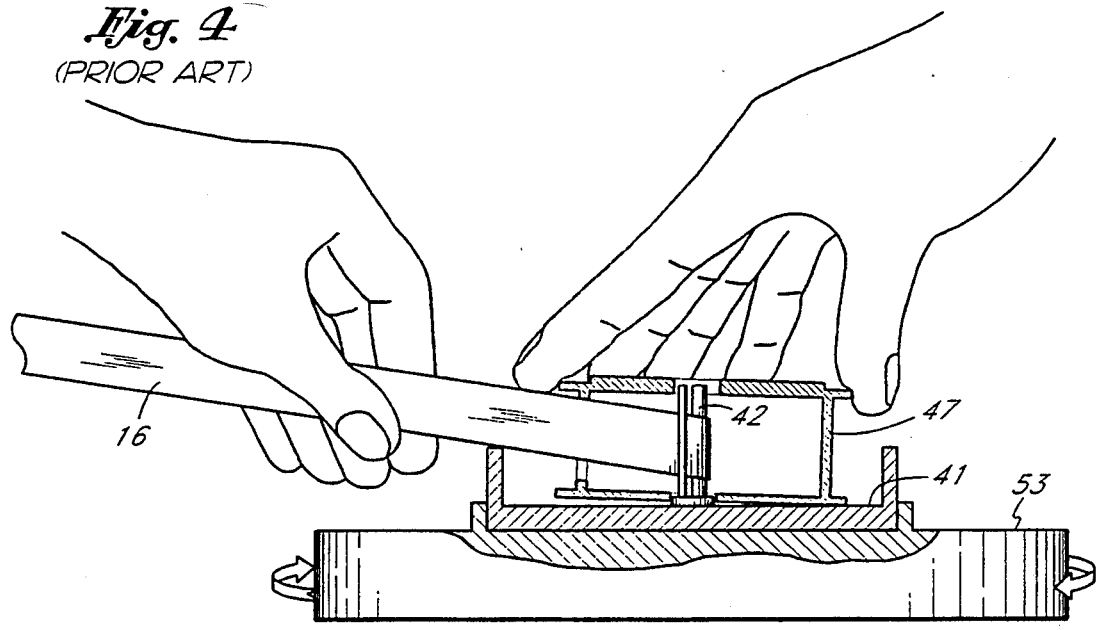
FIG. 4 is a side view partly in cross section of a prior art tape measure housing showing the assembly of the spring thereon.
Figure 5:
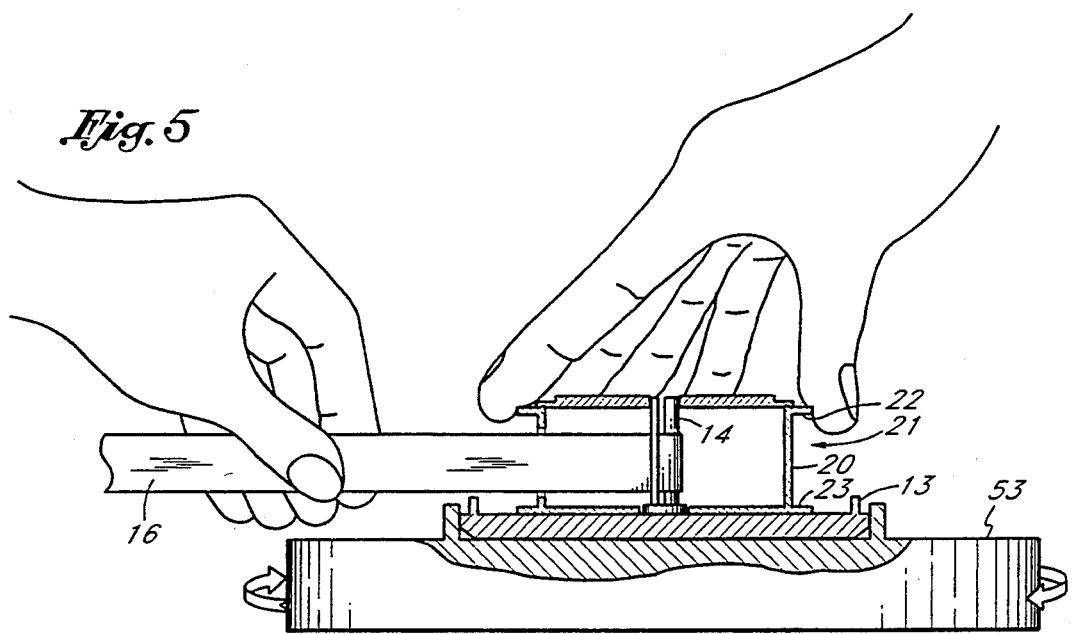
FIG. 5 is a view analogous to FIG. 4 except that the tape measure housing of the present invention is utilized.

The difficulty with the prior art is shown by comparing FIGS. 4 and 5. The prior art assembly method is shown in FIG. 4 where the base 41 is secured in a cavity in a revolving table 53. The spring 16 is inserted into slotted pin 42 and as table 53 turns, spring 16 is wound about slotted pin 42. It can be seen that spring 16 must be held at an angle above the horizontal and this operation is very difficult for the operator since the spring 16 is quite stiff. Accidents can result from this operation and the speed with which the operator can assemble a tape measure is severely diminished by the necessity of holding spring 16 at an angle. It should be noted that as the table is turned, the pin 42 turns with table 53. but roller 47 is held in a non-turning manner until the section end of the ring portion of roller 47.

In contrast, the assembly of the present invention permits spring 16 to be wound on slotted pin 14 in a horizontal and safe manner. Then after the assembly is completed, frame 25 is slipped onto base 11 with the tape locking device 32 in place. Next, the cover plate 38' is inserted and screws 35 are tightened to complete the assembly.

The result of the use of the construction of the present invention is a tape measure which is fully as useful as the prior art tape measure but which provides a far safer manufacturing process. It also increases the rate of production because of the ease of the assembly.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved housing for a reel of measuring tape of the type which has a base member which supports a slotted pin which, in turn, holds an inner end of a tensioning spring, a measuring tape-supporting roller having an inner compartment for confining the tensioning spring and an outer surface for holding a coiled length of measuring tape, a tensioning spring which is coiled by feeding it through an opening in the measuring tape supporting roller, and turning the slotted pin with respect to the roller, and a measuring tape, wherein the improvement comprises:

said base member having a flat base which supports said slotted pin, said base member having a peripheral edge which extends an insubstantial amount above said flat base;

a frame which is completely separate from said base member during assembly but when assembled is held at the peripheral edge of said base member and extends upwardly a distance to surround said tape-supporting roller, said frame having a lower edge which mates with the base member and an upper edge and said frame including a measuring tape exit slot and said frame also including a minor cover member adjacent said measuring tape exit slot;

a measuring tape supporting roller supported by said slotted pin, said roller having a circular ring having a slot sufficiently large for the tensioning spring to pass through and said circular ring having an upper flange at an upper end and a lower flange at a lower end;

an upper base and a major cover member having a flat top and a peripheral edge which peripheral edge abuts said upper edge of said frame and said base member being completely separate from said upper base during assembly so that the base member can be turned on a table without any upper base being affixed thereto; and means for securing the base member, the frame and the upper base and major cover member together.

2. The improved housing for a reel of measuring tape of claim 1 wherein said upper base and cover member includes a cut-out of the same size and shape as the cover portion of said frame so that when the housing is assembled a portion of the cover is formed by the cover portion of said frame and the balance of the cover is formed by said cover member.

3. The improved housing for a reel of measuring tape of claim 1 wherein said frame member includes at least one frame support and alignment cylinder.

4. The improved housing for a reel of measuring tape of claim 3 wherein said frame has four corners, an inner surface and an outer surface, and said frame support and alignment cylinder is positioned at one of said four corners at the inner surface of the frame.

5. The improved housing for a reel of measuring tape of claim 1 further including a tape locking device supported by said lower base, said upper base and said frame, said tape locking device having a knurled operating handle.

6. The improved housing for a reel of measuring tape of claim 5 wherein said frame has four sides, one of said sides including said measuring tape exit slot, and said side which contains said measuring tape exit slot has an opening through which said knurled operating handle extends.

* * * * *